(12) United States Patent
Marchese et al.

(10) Patent No.: US 10,470,450 B2
(45) Date of Patent: Nov. 12, 2019

(54) FISHING ROD LINE THREADER (71) Applicants: Patrick John Marchese, Fort Worth, TX (US); James Kelly Jordon, Flint, TX (US)

(72) Inventors: Patrick John Marchese, Fort Worth, TX (US); James Kelly Jordon, Flint, TX (US)

(73) Assignee: FISH-EYEZ, LLC, Fort Worth, TX (US)

( * ) Notice: Subject to any disclaimer, the term of this patent is extended or adjusted under 35 U.S.C. 154(b) by 195 days.

(21) Appl. No.: 15/793,955

(22) Filed: Oct. 25, 2017

(65) Prior Publication Data

US 2019/0116774 A1 Apr. 25, 2019

(51) Int. Cl.
*A01K 91/00* (2006.01)
*A01K 91/03* (2006.01)

(52) U.S. Cl.
CPC .................... *A01K 91/03* (2013.01)

(58) Field of Classification Search
CPC ....... A01K 91/03; A01K 91/04; A01K 91/047
See application file for complete search history.

(56) References Cited

U.S. PATENT DOCUMENTS

| | | | |
|---|---|---|---|
| 2,324,176 A | 7/1943 | Smith | |
| 2,783,571 A | 3/1957 | Stilwell | |
| 3,357,086 A | * 12/1967 | Hood | A01K 91/04 223/99 |
| 3,913,630 A | 10/1975 | Rubey | |
| 4,144,605 A | 3/1979 | Eberhardt | |
| 4,265,179 A | 5/1981 | Tupper et al. | |
| 4,313,236 A | 2/1982 | Tupper et al. | |
| 4,352,330 A | 10/1982 | Tupper | |
| 4,357,889 A | 11/1982 | Tupper | |
| 4,459,916 A | 7/1984 | Tupper | |
| 4,462,316 A | 7/1984 | Tupper | |

(Continued)

FOREIGN PATENT DOCUMENTS

| | | |
|---|---|---|
| DE | 199 02 199 A1 | 7/1999 |
| GB | 2096959 | 10/1982 |

(Continued)

OTHER PUBLICATIONS

International Search Report, PCT/US2018/053609, dated Dec. 11, 2018 (2 pages).

(Continued)

*Primary Examiner* — Richard G Davis (57) ABSTRACT

A system and device for threading fishing line through guides mounted on a fishing rod is disclosed, along with a method for using the system or device. A shaft is supported between paired gates. The shaft has a back end to attach to a fishing line. A carrier assembly is configured to hold the paired gates, and to permit mounted guides to pass between open paired gates while being threaded with the fishing line by the shaft, as the shaft is being fixedly retained between other paired gates. A funneling channel of an end cap module is attached to the carrier assembly near the front end of the shaft. While passing the carrier assembly over each of the mounted guides, the funneling channel funnels each of the mounted guides to encircle the front end of the shaft, thereby threading the mounted guides with fishing line.

24 Claims, 10 Drawing Sheets

(56) References Cited

U.S. PATENT DOCUMENTS

| | | | |
|---|---|---|---|
| 4,560,098 A | 12/1985 | Tupper | |
| 4,593,447 A * | 6/1986 | Tupper | A01K 97/00 29/241 |
| 4,674,220 A | 6/1987 | Bearce, Jr. | |
| D294,630 S | 3/1988 | Tupper | |
| 4,732,343 A | 3/1988 | Maruyama | |
| 4,915,631 A | 4/1990 | Robinson et al. | |
| 5,591,686 A | 1/1997 | Hamashima | |
| 6,026,607 A | 2/2000 | Bukowski | |
| 6,041,541 A | 3/2000 | Davis | |
| 6,050,018 A | 4/2000 | Allen | |
| 7,007,905 B2 | 3/2006 | Roberts | |
| 7,716,768 B2 | 5/2010 | Higgins | |
| 7,793,459 B1 | 9/2010 | Ruzika | |
| 9,084,414 B1 | 7/2015 | Fender | |
| 2001/0039754 A1 | 11/2001 | Friederichs, III | |
| 2009/0241407 A1 | 10/2009 | Eisbrenner | |

FOREIGN PATENT DOCUMENTS

| | | |
|---|---|---|
| GB | 2097052 | 10/1982 |
| GB | 2108578 | 5/1983 |
| GB | 2130157 | 5/1984 |
| JP | 2000-125734 A | 5/2000 |

OTHER PUBLICATIONS

Written Opinion of the International Searching Authority, PCT/US2018/053609, dated Dec. 11, 2018 (5 pages).

Ultra Fishing Tackle, Thread Easy Line Threader, Apr. 9, 2006, 1 pg., http://thefishingcoach.co.uk/thread-easy-line-threader/.

Fuji, Speed Threader, 2016, 1 pg., http://anglersresource.net/SpeedThreader.aspx.

* cited by examiner (PRIOR ART)

FISHING ROD LINE THREADER

FIELD OF THE DISCLOSURE

The present disclosure pertains to the field of fishing equipment. In particular, the disclosure relates to a system and a device for threading fishing line through guides or eyes of a fishing rod, and a method for using such a system or device to thread fishing line through guides or eyes of a fishing rod.

BACKGROUND OF THE DISCLOSURE

Modern fishing rods often include guides or eyes, which may have relatively small diameters and may be difficult to thread with fishing line by hand. On the other hand, even the most typical guides or eyes, which have average diameters, may be difficult to thread by hand under certain circumstances, for example in poor lighting conditions, in a wind, or on a moving boat.

One relatively simple device to assist with threading fishing lines through the guides or eyes of a fishing rod by hand, involves a bent or crimped wire loop, which may be inserted through the guides or eyes in either a forward direction or in a backward direction and then used to drag fishing line through the guides or eyes in either the same direction or in the opposite direction, respectively. While a bent or crimped wire loop may be more rigid than fishing line, and may provide some assistance with threading fishing lines, by hand, through guides or eyes that have average diameters, it may not provide much assistance, for example, with threading guides or eyes that have relatively small diameters, or in circumstances of poor lighting.

Another device, which has been suggested for threading fishing line through the guides or eyes of a fishing rod is described in U.S. Pat. No. 4,593,447. It involves a star wheel formed of two half sections secured together and rotatably mounted such that radial-projecting confronting surfaces of the mated star wheel half sections near the tips form arcuate grooves in which an arcuate central portion of a rod-like threading member is slidably located between them. The threading member has elongate end portions projecting one on each side of the star wheel and one end is for connecting the fishing line to be threaded by the arcuate threading device. While such an arcuate threading device may also provide some assistance with threading fishing lines through guides or eyes that have average diameters, it too may not provide much assistance with threading guides or eyes that have relatively small diameters, or in circumstances of poor lighting, for example.

To date, potential solutions to such difficult circumstances and or technical difficulties have not been adequately explored.

BRIEF DESCRIPTION OF THE DRAWINGS

The present invention is illustrated by way of example and not limitation in the figures of the accompanying drawings. The accompanying drawings are not necessarily to scale.

DETAILED DESCRIPTION

The following description discloses a system and device for threading fishing line through guides mounted on a fishing rod. A method of using the system or device is also disclosed.

An elongate shaft may be supported between a plurality of paired gates. The elongate shaft has a front end, and a back end to attach to a fishing line. A carrier assembly may be configured to hold the plurality of paired gates, and to permit guides or eyes, mounted on a fishing rod, to pass between open paired gates while being threaded with the fishing line by the elongate shaft, as the elongate shaft is being fixedly retained between other paired gates of the plurality. A funneling channel of an end cap module is attached to the carrier assembly near the front end of the elongate shaft. While passing the carrier assembly over each of the mounted guides, the funneling channel funnels the mounted guides to encircle the front end of the elongate shaft, thereby facilitating the threading of mounted guides with fishing line.

Thus in one embodiment using a funneling channel of an end cap module, a mechanically assisted process for threading fishing line through mounted guides or eyes of a fishing rod may provide additional assistance with threading guides or eyes that have relatively small diameters of, for example 4 to 5 millimeters or less, and/or in circumstances of poor lighting, for example.

Figures 1, 1A, 1B, 1C:
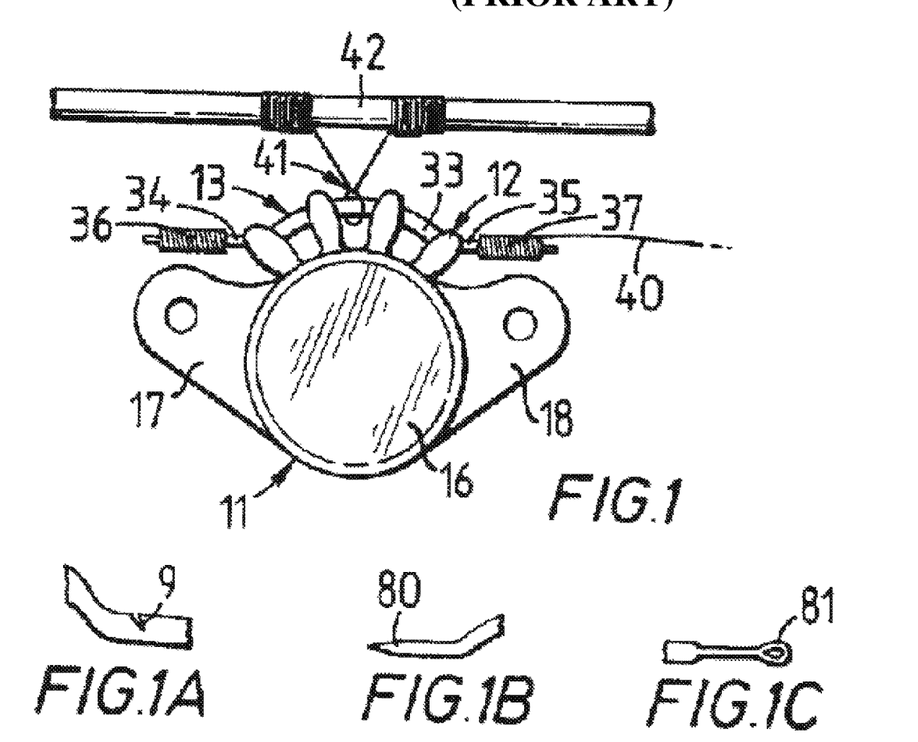
FIG. 1 is a diagram of a prior art fishing line threading device.
FIGS. 1A-1C are diagrams of threading member portions of a prior art fishing line threading device.

FIG. 1 is a diagram of a prior art fishing line threading device described in U.S. Pat. No. 4,593,447. It involves a star wheel 12 formed of two half sections secured together and rotatably mounted such that radial-projecting confronting surfaces of the mated star wheel half sections near the tips form arcuate grooves in which an arcuate central portion of a rod-like stainless steel threading member 13 is slidably located between them. The threading member 13 has elongate end portions projecting one on each side of the star wheel 12 and one end is for connecting the fishing line to be threaded by the arcuate threading device. Even if such an arcuate threading device could provide some assistance with threading fishing lines through guides or eyes that have average diameters of, for example 8 millimeters, it may not provide much assistance with threading guides or eyes that have relatively small diameters of, for example 4 to 5 millimeters or less; nor in circumstances of poor lighting, for example.

FIGS. 1A, 1B and 1C are diagrams of threading member portions 9, 80 and 81, respectively, of the prior art fishing line threading device. It may be noted that the threading member of the prior art fishing line threading device has a shape similar to the Greek character, Ω (omega). In order to thread guides or eyes using such a threading member of the prior art fishing line threading device, it was necessary to 'snake' the omega-shaped threading member through a guide or an eye and past multiple changes in the curvature of the threading member, while radial-projecting confronting surfaces, near the tips of mated star wheel half sections, slide around the arcuate central portion of the threading member, and on-and-off of the threading member at the changes in curvature of the threading member's omega-shape.

This principle of operation, in the prior art fishing line threading device, tends to complicate the guide-threading process and provides potential points of failure, for example, at or around the changes in curvature of the threading member's omega-shape. It will be appreciated by skilled artisans, that an improvement in the guide-threading process, which is less complicated and reduces potential points of failure would be desirable.

Figure 2:
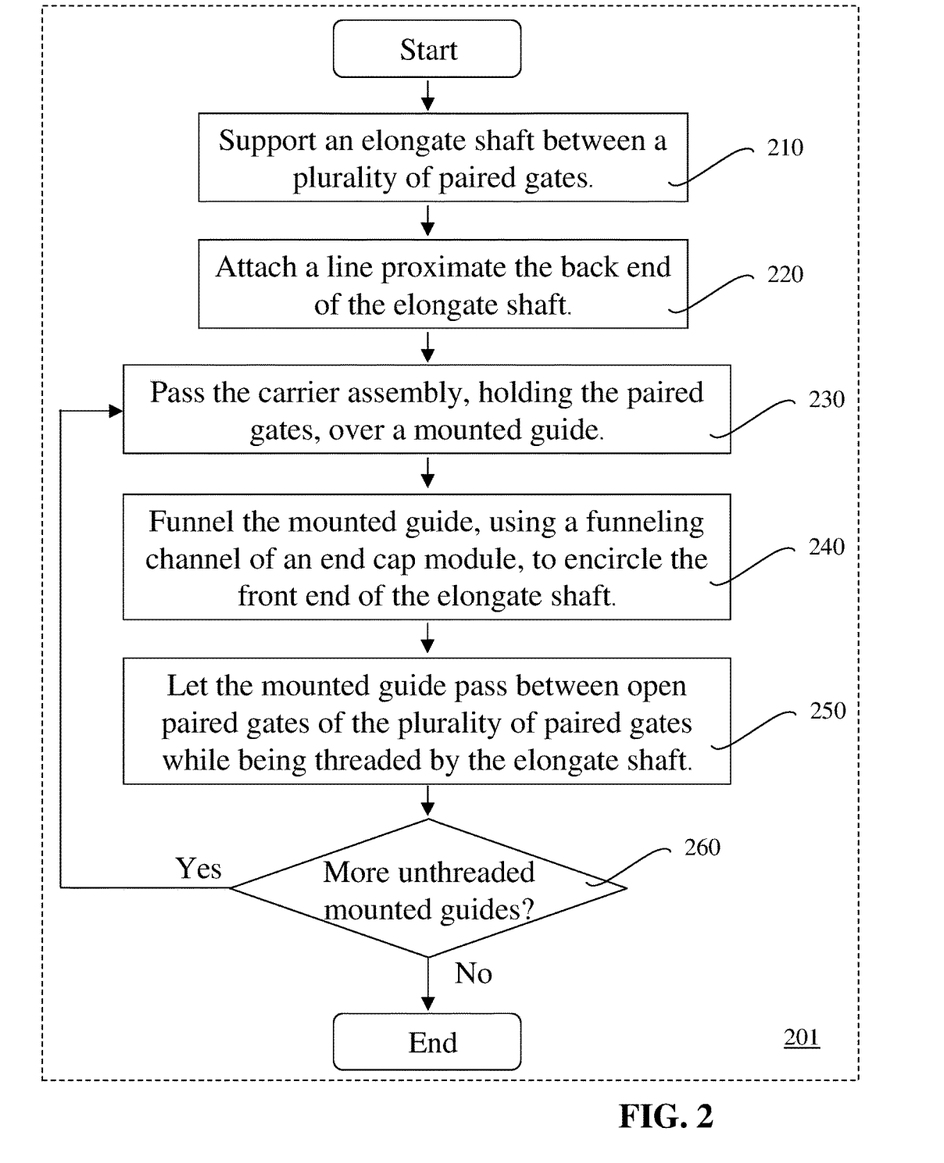
FIG. 2 illustrates a flow diagram for one embodiment of a mechanically assisted process for threading fishing line through mounted guides or eyes of a fishing rod.

FIG. 2 illustrates a flow diagram for one embodiment of a mechanically assisted process 201 for threading fishing line through mounted guides or eyes of a fishing rod. Process 201 starts in process step 210, with supporting an elongate shaft (a.k.a. a bobbin or bayonet) between a plurality of paired gates, wherein the elongate shaft has a front end, and has a back end for detachably attaching to a fishing line proximate the back end of the elongate shaft in process step 220. Some embodiments of the elongate shaft are of a constant curvature, or zero curvature, to eliminate complicated 'snaking' movements from the process of threading each of a plurality of mounted guides. In some embodiments pairs of gates of the plurality of paired gates may be opened or closed around the elongate shaft.

The process of threading each of a plurality of mounted guides continues in process step 230, with passing a carrier assembly, having an open channel to hold the plurality of paired gates, over one of the plurality of mounted guides. The process 201 proceeds in process step 240, with funneling the mounted guide, using a funneling channel of an end cap module detachably attached to the carrier assembly proximate the front end of the elongate shaft, to encircle the front end of the elongate shaft. It will be appreciated by skilled artisans, that by using a funneling channel of an end cap module, process 201 may provide additional assistance with threading guides or eyes that have relatively small diameters of, for example 4 to 5 millimeters or less, and/or in circumstances of poor lighting, for example. Then in process step 250, the carrier assembly is configured to permit each mounted guide to pass between open paired gates of the plurality of paired gates while being threaded with the line by the elongate shaft, wherein the elongate shaft is fixedly retained between other closed paired gates while the mounted guide passes between open paired gates, for example, one pair at a time.

In process step 260, a determination is made as to whether or not there are more unthreaded mounted guides remaining. If so, the process reiterates on the next mounted guide of the plurality of mounted guides, beginning in process step 230. Otherwise, if there are no more unthreaded mounted guides remaining in process step 260, process 201 for threading mounted guides ends.

It will also be appreciated that as a principle of operation in some embodiments the passing of mounted guides between open paired gates, eliminates the need for grooves of confronting surfaces to slide around an omega shaped threading member and on-and-off of the threading member at the changes in curvature of the threading member's omega-shape.

Figure 3:
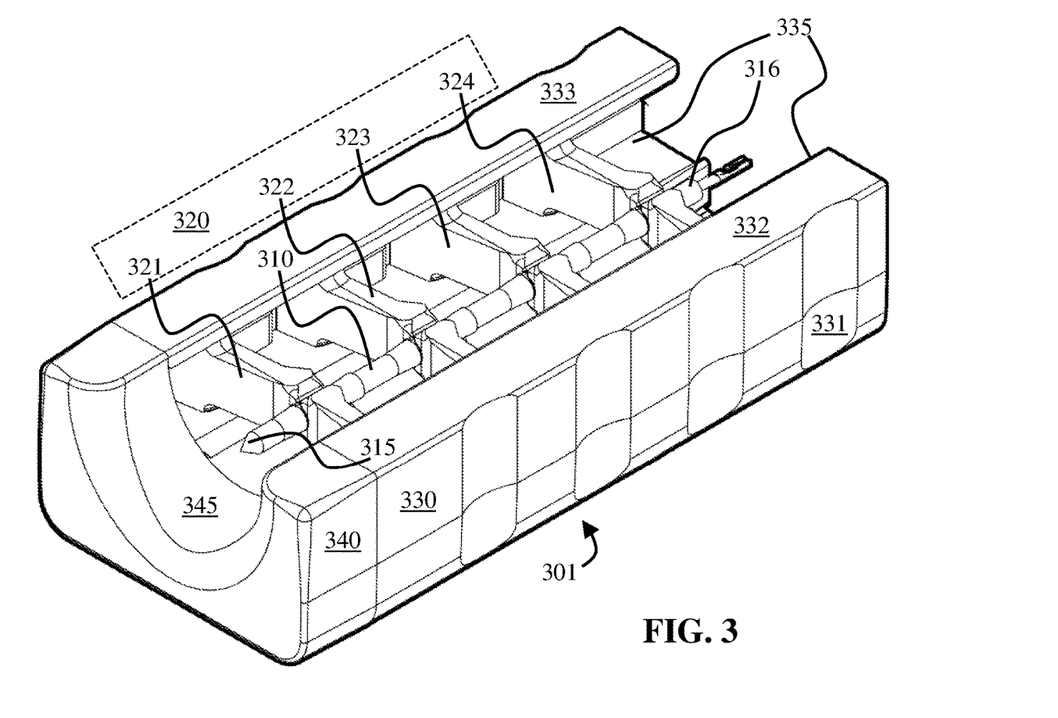
FIG. 3 is an approximate isometric projection diagram for one embodiment of a mechanical system for threading fishing line through mounted guides or eyes of a fishing rod.

FIG. 3 is an approximate isometric projection diagram for one embodiment of a mechanical system 301 for threading fishing line through mounted guides or eyes of a fishing rod. Mechanical fishing line threading system 301 comprises a first means 310 for holding a fishing line, the first means having a front end 315, and having a back end 316 for detachably attaching to the fishing line proximate the back end 316. The mechanical fishing line threading system 301 also comprises a second means 320 for fixedly retaining the first means 310 to thread a fishing rod with the fishing line. In some embodiments the first means 310 may include an elongate shaft of a constant curvature, or zero curvature, to eliminate any complicated 'snaking' movements from the process of threading a plurality of mounted guides. In some embodiments the second means 320 may include a plurality of paired gates 320, such as paired gates 321, paired gates 322, paired gates 323 and paired gates 324 to support the first means 310 between the plurality of paired gates 320.

The mechanical fishing line threading system 301 also comprises a third means 330 for holding the second means 320 to permit a plurality mounted guides on the fishing rod (not shown) to pass through the second means 320 while being threaded with the fishing line by said first means 310. In some embodiments the third means 330 may include a carrier assembly 330 having an open channel 335, e.g. wherein said carrier assembly 330 may be configured to hold a plurality of paired gates 320. In some embodiments of the mechanical fishing line threading system 301, an end cap module 340 may be detachably attached to said third means 330 proximate a front end 315 of the first means 310 to direct each of the plurality of mounted guides, e.g. using a funneling channel 345, to encircle the front end 315 of the first means 310, so as to be threaded with the fishing line by said first means 310.

It will be appreciated that the funneling channel 345 of end cap module 340 may provide additional assistance with threading guides or eyes that have relatively small diameters of, for example 4 to 5 millimeters or less, and/or in circumstances of poor lighting. It will be further appreciated that due to said first means 310 being of a constant curvature or of zero curvature, improvement in the guide-threading process is provided, making guide-threading less complicated than prior art processes and reducing potential points of failure. It will also be appreciated that in some embodiments, having the first means 310 of a constant curvature, or of zero curvature, may have an unexpected beneficial result, i.e. the facilitation of greater miniaturization in order to provide additional assistance with threading micro guides or eyes that have very small diameters of, for example 1 to 2 millimeters or less.

Figure 4:
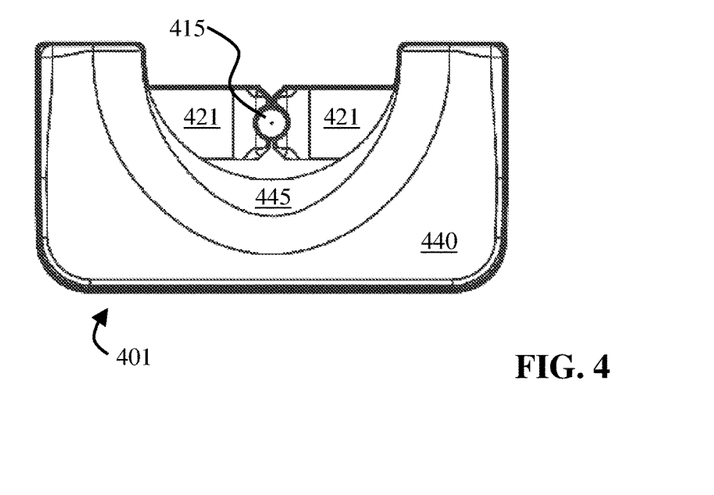
FIG. 4 is an approximate front view diagram for one alternative embodiment of a mechanical system for threading fishing line through mounted guides or eyes of a fishing rod.

FIG. 4 is an approximate front view diagram for one alternative embodiment of a mechanical system 401 for threading fishing line through mounted guides or eyes of a fishing rod. The mechanical fishing line threading system 401 comprises an end cap module 440, which may be detachably attached to a carrier assembly, e.g. carrier assembly 330, proximate the front end 415 of an elongate shaft to direct each of a plurality of mounted guides, using a funneling channel 445, toward the front end 415 of the elongate shaft, so as to be threaded with fishing line by said elongate shaft.

In some embodiments of the mechanical fishing line threading system 401, the elongate shaft is fixedly retained between paired gates, e.g. paired gates 421, while mounted guides pass between open paired gates, and a carrier assembly, e.g. carrier assembly 330, is configured to permit each mounted guide to pass between open paired gates of a plurality of paired gates while being threaded with the line by the elongate shaft, which is fixedly retained between other, closed paired gates, e.g. paired gates 421.

Figure 5:
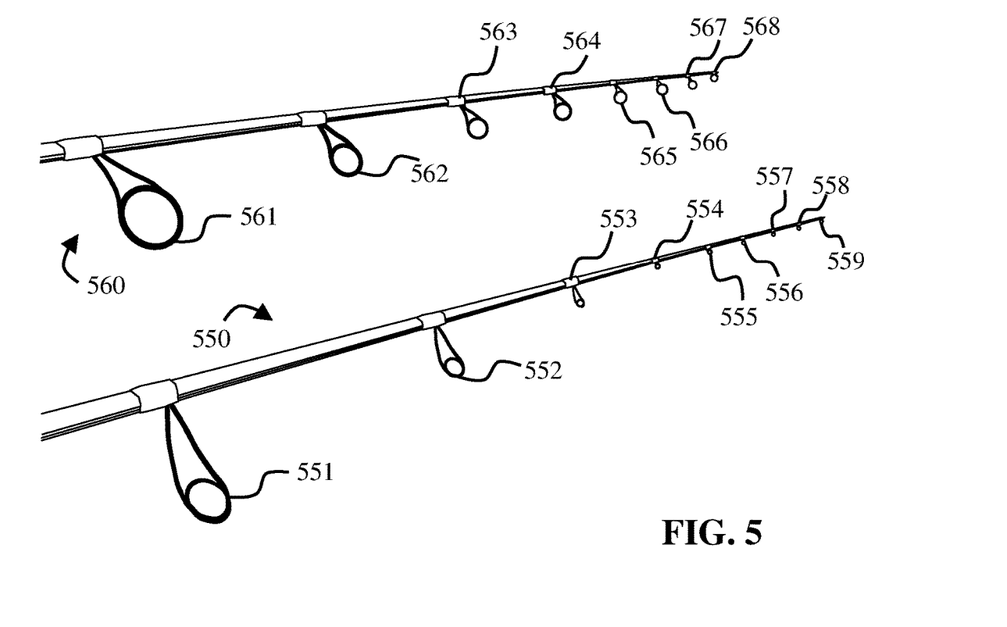
FIG. 5 illustrates two alternative styles of fishing rods with variously sized guides or eyes fixedly mounted upon them.

FIG. 5 illustrates two alternative styles of fishing rods, 550 and 560, with variously sized guides or eyes, 551-559 and 561-568, fixedly mounted upon them, respectively. In use with a style of the fishing rod 560, for example, the smallest diameter of the plurality of mounted guides 561-568 that the funneling channel 345 or 445 is sized to accommodate in some embodiments may be 6 to 10 millimeters. The largest diameters of the plurality of mounted guides 561-568 that a funneling channel 345 or 445 is sized to accommodate in some embodiments may be 30 to 50 millimeters. In use with a style of the fishing rod 550, on the other hand, the smallest diameter of the plurality of mounted guides 551-559 that the funneling channel 345 or 445 is sized to accommodate in some embodiments may be 3 to 6 millimeters or even smaller, 1 to 2 millimeters for example. But the largest diameters of the plurality of mounted guides that said funneling channel 345 or 445 is sized to accommodate in some embodiments may be 15 to 30 millimeters or even smaller, only 12 to 20 millimeters for example.

As described above, as a result of embodiments of a first means 310 being of a constant curvature or of zero curvature, improvements in the guide-threading process may be provided by making guide-threading less complicated than prior art processes and reducing potential points of failure. It will also be appreciated that facilitating miniaturization in order to provide assistance with threading micro guides or eyes that have very small diameters of, for example 1 to 2 millimeters or less, may be considered as an unexpected beneficial result of embodiments of the first means 310 being of a constant curvature, or of zero curvature. It should also be noted that such results are beneficial technical results. It will also be appreciated that facilitating miniaturization to provide assistance with threading micro guides or eyes (angled with respect to the rod or blank) that have relatively small diameters of, for example 3 to 6 millimeters or less, may also be considered as another unexpected beneficial result of embodiments of a first means 310 being of a constant curvature.

Figure 6:
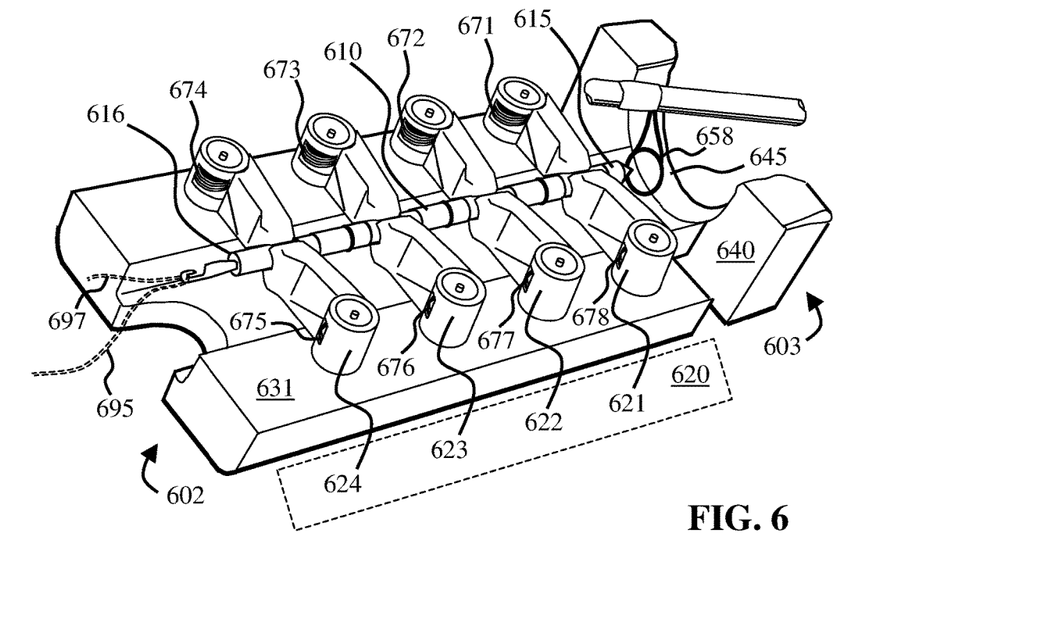
FIG. 6 is an approximate dimetric projection diagram for partially assembled components of one alternative embodiment of a mechanical system for threading fishing line through mounted guides or eyes of a fishing rod.

FIG. 6 is an approximate dimetric projection, diagram for partially assembled components of one alternative embodiment of a mechanical system 602 for threading fishing line through mounted guides or eyes of a fishing rod. The mechanical fishing line threading system 602 comprises a first means 610 for holding a fishing line 695, the first means 610 having a front end 615, and having a back end 616 for detachably attaching to the fishing line proximate the back end 616. In some embodiments the fishing line 695 may be attached by a hook at the back end 616, leaving a pigtail 697 of fishing line to provide friction while threading the fishing line 695 through mounted guides or eyes of a fishing rod. The mechanical fishing line threading system 602 also comprises a second means 620 for fixedly retaining the first means 610 to thread a fishing rod with the fishing line 695. In some embodiments the second means 620 may include a plurality of paired gates 620, such as paired gates 621, paired gates 622, paired gates 623 and paired gates 624 to support the first means 610, as shown, between the plurality of paired gates 620. In some embodiments the second means 620 may include more or less paired gates.

The mechanical fishing line threading system 602 also comprises a third means 631 for holding the second means 620 to permit a plurality of mounted guides 658 on the fishing rod to pass through the second means 620 while being threaded with the fishing line 695 by said first means 610. In some embodiments the third means 631 may comprise a carrier assembly, e.g. such as carrier assembly 330, configured to hold a plurality of paired gates 620. In some embodiments of the mechanical fishing line threading system 602, an end cap module 640 may be detachably attached to said third means 631 proximate a front end 615 of the first means 610 to direct each of the plurality of mounted guides 658, e.g. using a funneling channel 645, to encircle the front end 615 of the first means 610, so as to be threaded with the fishing line 695 by said first means 610. It will be appreciated that the funneling channel 645 of end cap module 640 may provide additional assistance with threading micro guides or eyes that have relatively small diameters of, for example 4 to 5 millimeters or less, and/or in circumstances of poor lighting or poor visibility.

In some embodiments of paired gates 620, each of paired gates 621, paired gates 622, paired gates 623 and paired gates 624 may comprise a pair of spring loaded mechanisms, 671 and 678, 672 and 677, 673 and 676, 674 and 675, respectively to fixedly retain the first means 610 to thread mounted guides of a fishing rod with the fishing line 695.

It will also be appreciated that as a result of first means 610 being of a constant curvature or of zero curvature, improvements in the guide-threading process are provided, making guide-threading less complicated than prior art processes and reducing potential points of failure. It will also be appreciated that in some embodiments having the first means 610 of a constant curvature or of zero curvature, may have an unexpected beneficial result, i.e. the facilitation of greater miniaturization in order to provide additional assistance with threading micro guides or eyes that have very small diameters of, for example 1 to 2 millimeters or less.

Figure 7:
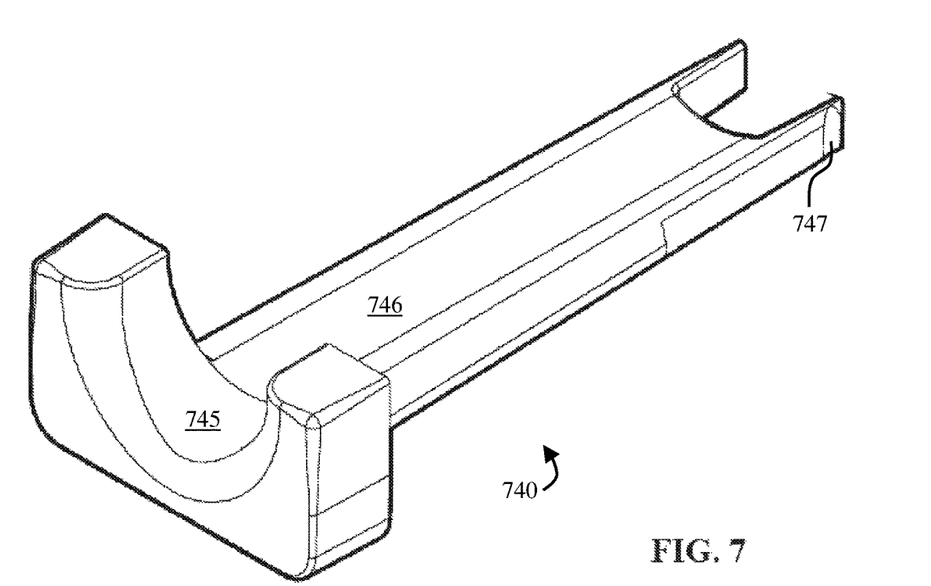
FIG. 7 is an approximate isometric projection diagram of one embodiment of an end cap module having a funneling channel, which may be sized to accommodate a plurality of variously sized mounted guides.

FIG. 7 is an approximate isometric projection diagram of one embodiment of an end cap module 740 having a funneling channel 745, which may be sized to accommodate a plurality of variously sized mounted guides. End cap module 740 may be detachably attached (e.g. to the third means 631 which may comprise a carrier assembly 330, proximate a front end of a first means 310 for holding a fishing line) to direct each of a plurality of mounted guides toward the front end of said first means, so as to be threaded with the fishing line by said first means. In some embodiments end cap module 740 may be detachably attached to a carrier assembly, using a flexible snapping mechanism 747. Embodiments of end cap module 740 may also comprise a gutter 746 to accommodate a plurality of variously sized mounted guides and center them so as to be threaded with the fishing line, e.g. by the first means 310. In some embodiments the first means may comprise an elongate shaft having a front end and a back end, to be supported between a plurality of paired gates just above the center of gutter 746 so that variously sized mounted guides may be threaded with the fishing line by said elongate shaft.

In use with a particular style, e.g. of the fishing rod 560, the smallest diameter of mounted guides that funneling channel 745 is sized to accommodate in some embodiments may be 6 to 10 millimeters. The largest diameters of the plurality of mounted guides that funneling channel 745 is sized to accommodate in some embodiments may be 30 to 50 millimeters. In use with a style, e.g. of the fishing rod 550 on the other hand, the smallest diameter of mounted guides that funneling channel 745 is sized to accommodate in some embodiments may be 3 to 6 millimeters or even smaller, 1 to 2 millimeters for example. But the largest diameters of the plurality of mounted guides that funneling channel 745 is sized to accommodate in some embodiments may be 15 to 30 millimeters or even smaller, only 12 to 24 millimeters for example.

It will be appreciated that the funneling channel 745 and gutter 746 of end cap module 740 may provide additional assistance with threading micro guides or eyes that have relatively small diameters of, for example 4 to 5 millimeters or less, and/or in circumstances of poor lighting or poor visibility.

Figure 8A:
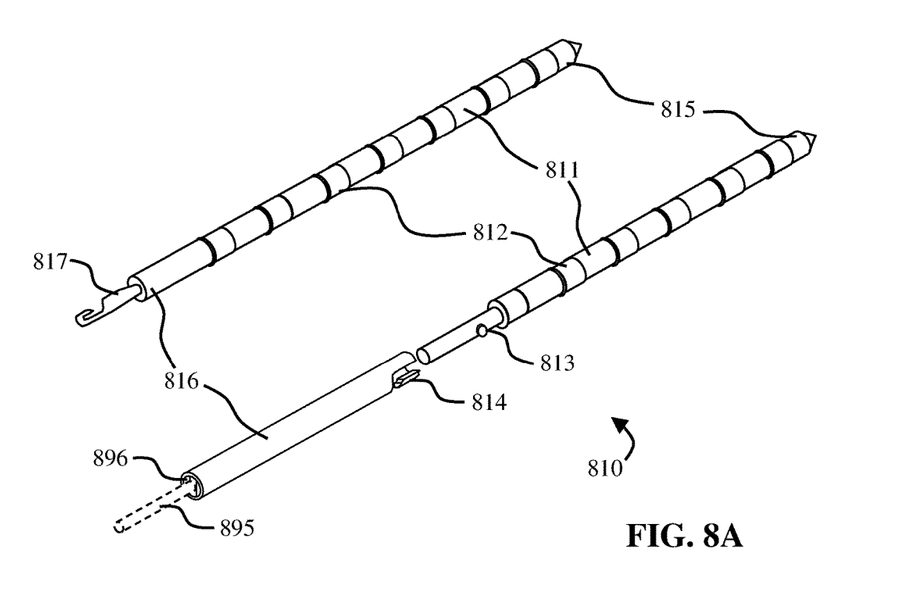
FIGS. 8A and 8B are approximate isometric projection diagrams of several alternative embodiments of elongate shafts, each having a front end, and having a back end to detachably attach to a fishing line.

FIG. 8A is an approximate isometric projection diagram of two alternative embodiments of an elongate shaft 810 having a front end 815, and having a back end 816 to detachably attach to a fishing line 895. Some embodiments of the elongate shaft 810 are of a constant curvature, or zero curvature, thereby eliminating any complicated 'snaking' movements from the process of threading mounted guides (not shown) with the elongate shaft 810. Some embodiments of the elongate shaft 810 may also comprise a hook 817 at the back end 816, for attaching of fishing line to be threaded through mounted guides or eyes of a fishing rod (not shown). Some embodiments of the elongate shaft 810 may also comprise alternating untapered segments 811 and tapered segments 812, e.g. to mitigate backward migration of the elongate shaft 810 between a plurality of paired gates.

In some embodiments of an elongate shaft 810, a fishing line diameter (e.g. a braided 120 lb. test line at 0.55 millimeters, or monofilament 80 lb. test line at 1 millimeters) may represent a substantial portion of the diameter of the smallest mounted guides or eyes (e.g. a 1 millimeter or 2 millimeter micro guide) of a fishing rod. In such cases, it may not be easy or even possible to pull a doubled fishing line (e.g. as in the fishing line 695 plus the pigtail 697) through the smallest mounted guides or eyes of a fishing rod. Therefore, a miniaturized means for attaching a single-diameter-width of fishing line at the back end 816 of an elongate shaft 810 is desirable. Accordingly, some embodiments of an elongate shaft 810 may comprise a female bayonet-mounted back end 816 and a male bayonet mount 813. In one such embodiment a fishing line 895 may be frictionally secured into the female bayonet-mounted back end 816 via a sabot 896 around the fishing line 895.

It will be appreciated that facilitating miniaturization to provide assistance with threading micro guides or eyes (angled with respect to the rod or blank) that have relatively small diameters of, for example 3 to 6 millimeters or less, may be considered as another unexpected beneficial result of embodiments of an elongate shaft 810 being of a constant curvature, and further resulting in said elongate shaft 810 having a miniaturized means for attaching a single-diameter-width of fishing line at the back end 816. It should be noted that such means are technical means and that by such technical means, technical results are achieved.

Figure 8B:
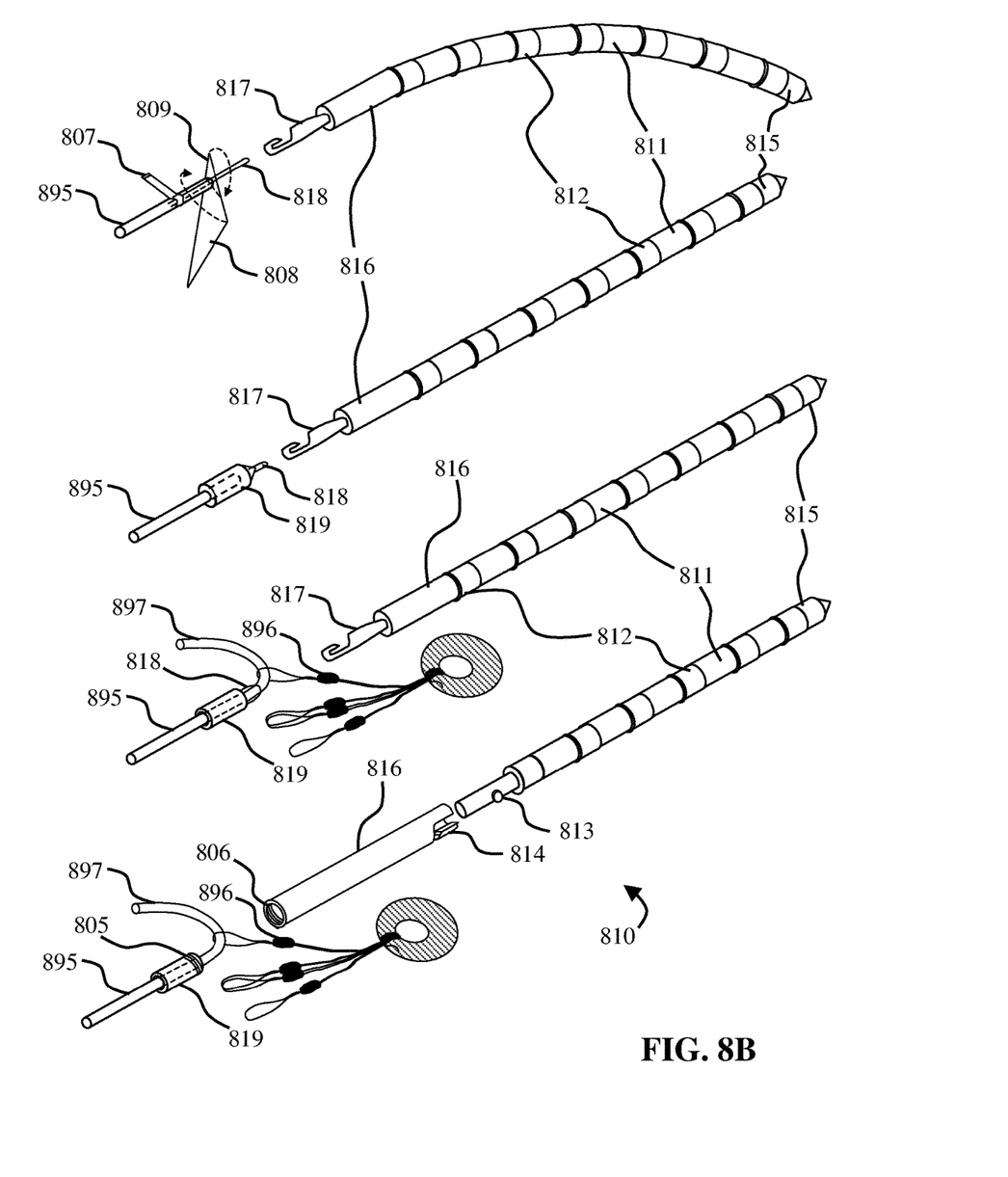

FIG. 8B is an approximate isometric projection diagram of four more alternative embodiments of an elongate shaft 810 having a front end 815, and having a back end 816 to detachably attach to a fishing line 895. In some alternative embodiments elongate shaft 810 may be flexible and/or have a constant curvature. In some alternative embodiments elongate shaft 810 may have substantially zero curvature. Some embodiments of the elongate shaft 810 may also comprise alternating untapered segments 811 and tapered segments 812, e.g. to mitigate backward migration of the elongate shaft 810 between a plurality of paired gates.

Some embodiments of the elongate shaft 810 may also comprise a hook 817 at the back end 816, for attaching of fishing line to be threaded through mounted guides or eyes of a fishing rod. In some embodiments of elongate shaft 810, a fishing line diameter (e.g. a braided 120 lb. test line at 0.55 millimeters, or monofilament 80 lb. test line at 1 millimeters) may represent a substantial portion of the diameter of the smallest mounted guides or eyes (e.g. a 1 millimeter or a 2 millimeter micro guide) of a fishing rod. In such cases, means for attaching a single-diameter-width of fishing line at the back end 816 of an elongate shaft 810 is desirable.

In one such embodiment, means for taping a fine wire loop 818 to a fishing line 895 are disclosed, wherein a fine wire loop 818, for attaching to a hook 817, is tacked in place using a first tape 807 and then wrapped in a second tape 808 by folding over a portion 809 and wrapping the second tape 808 around the fine wire loop 818 and fishing line 895. In one alternative embodiment, means for attaching a fine wire loop 818 to a fishing line 895 via an end holder 819 are disclosed, wherein the end holder 819 has an imbedded fine wire loop 818 for attaching to a hook 817. In some embodiments, the fishing line 895 may be super-glued into a cone at one end of end holder 819. In some alternative embodiments, the end holder 819 may comprise a wire-nut style mechanism with which to secure the fishing line 895. In other alternative embodiments, the end holder 819 may comprise a mechanism with which to secure the fishing line 895 via a bobber-stopper 896 attachment to a fishing line 895 on the pigtail 897, with or without trimming the pigtail 897. In yet other alternative embodiments, the end holder 819 may comprise a cylindrical threaded mechanism 805 with which to secure the fishing line 895 using a bobber-stopper 896 attachment to a fishing line 895 on the pigtail 897, with a female cylindrical threaded mechanism 806 of a bayonet-mounted back end 816 via a female bayonet mount 814 and a male bayonet mount 813. In one such embodiment a fishing line 895 may be frictionally secured into a threaded end holder 819 via a sabot around a fishing line 895, e.g. bobber-stopper 896.

Figure 9A:
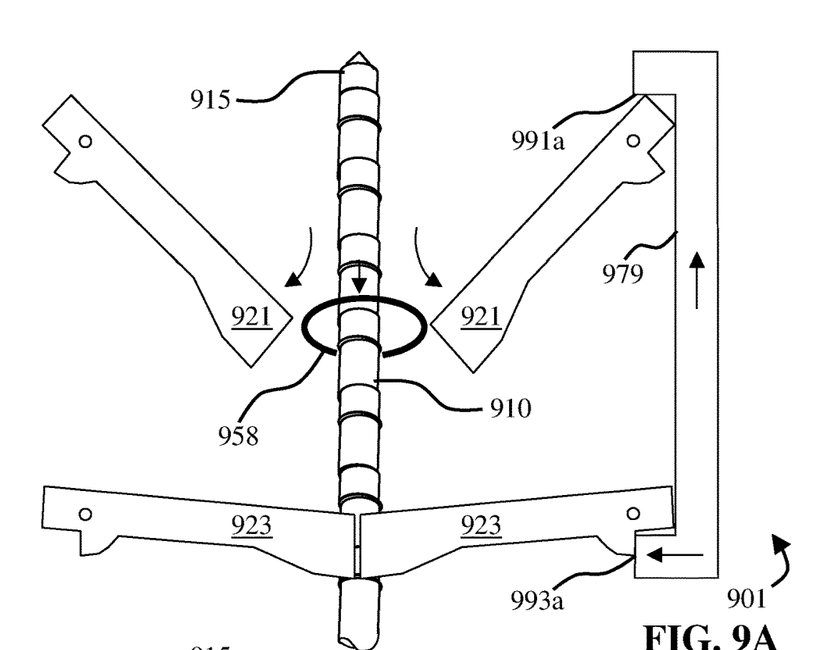
FIGS. 9A and 9B illustrate the functionality of one embodiment of a gate locking mechanism of a mechanical system for threading fishing line through mounted guides or eyes of a fishing rod.
Figure 9B:
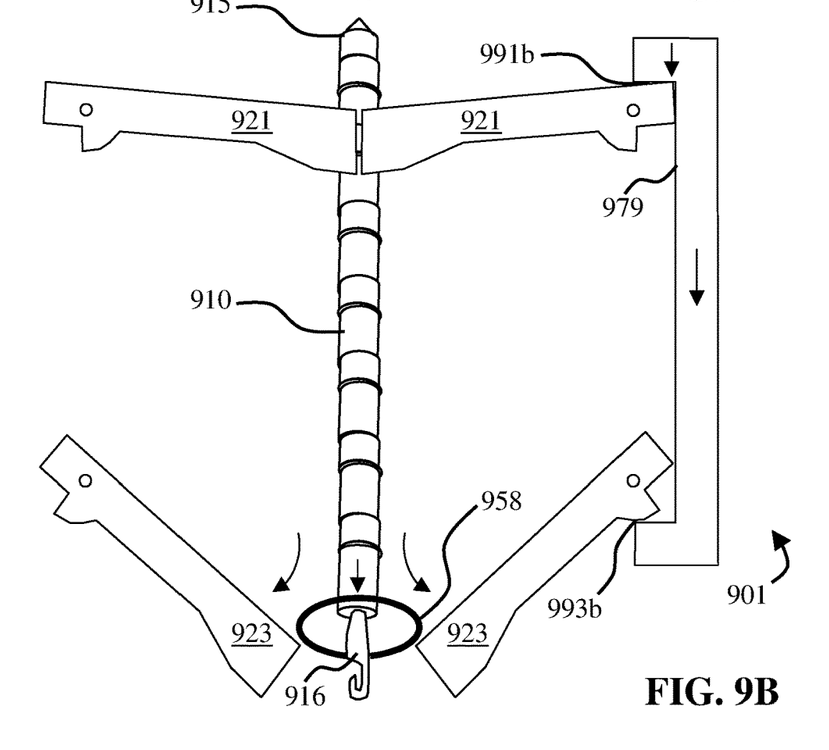

FIGS. 9A and 9B illustrate the functionality of one embodiment of a gate locking mechanism 901 of a mechanical system for threading fishing line through mounted guides or eyes of a fishing rod. As illustrated by FIG. 9A, in one embodiment a guide 958 mounted on a fishing rod (not shown) is directed, e.g. using a funneling channel 745, to encircle the front end 915 of an elongate shaft 910, so as to be threaded with fishing line (not shown) by said elongate shaft 910. As the elongate shaft 910 passes through the mounted guide 958, the mounted guide 958 is permitted by a forward position of a first stop 991a on slide lock 979 of the gate locking mechanism 901 to pass between an open set of paired gates 921, while a forward position of a second stop 993a on slide lock 979 prevents other paired gates 923 from opening so that the elongate shaft 910 is fixedly retained between the other set(s) of paired gates 923. It will be appreciated that for simplicity only two sets of paired gates are illustrated with a single slide lock 979, but that a plurality of paired gates in some preferred embodiments may include three or more sets of paired gates and that multiple slide locks 979 may also be employed.

As further illustrated by FIG. 9B, in one embodiment as the elongate shaft 910 continues to pass through the mounted guide 958 toward the back end 916, the mounted guide 958 is permitted by a backward position of the second stop 993b on slide lock 979 of gate locking mechanism 901 to pass between an open set of paired gates 923, while a backward position of the first stop 991b on slide lock 979 prevents other paired gates 921 from opening so that the elongate shaft 910 is fixedly retained between the other set(s) of paired gates 921.

Figure 10A:
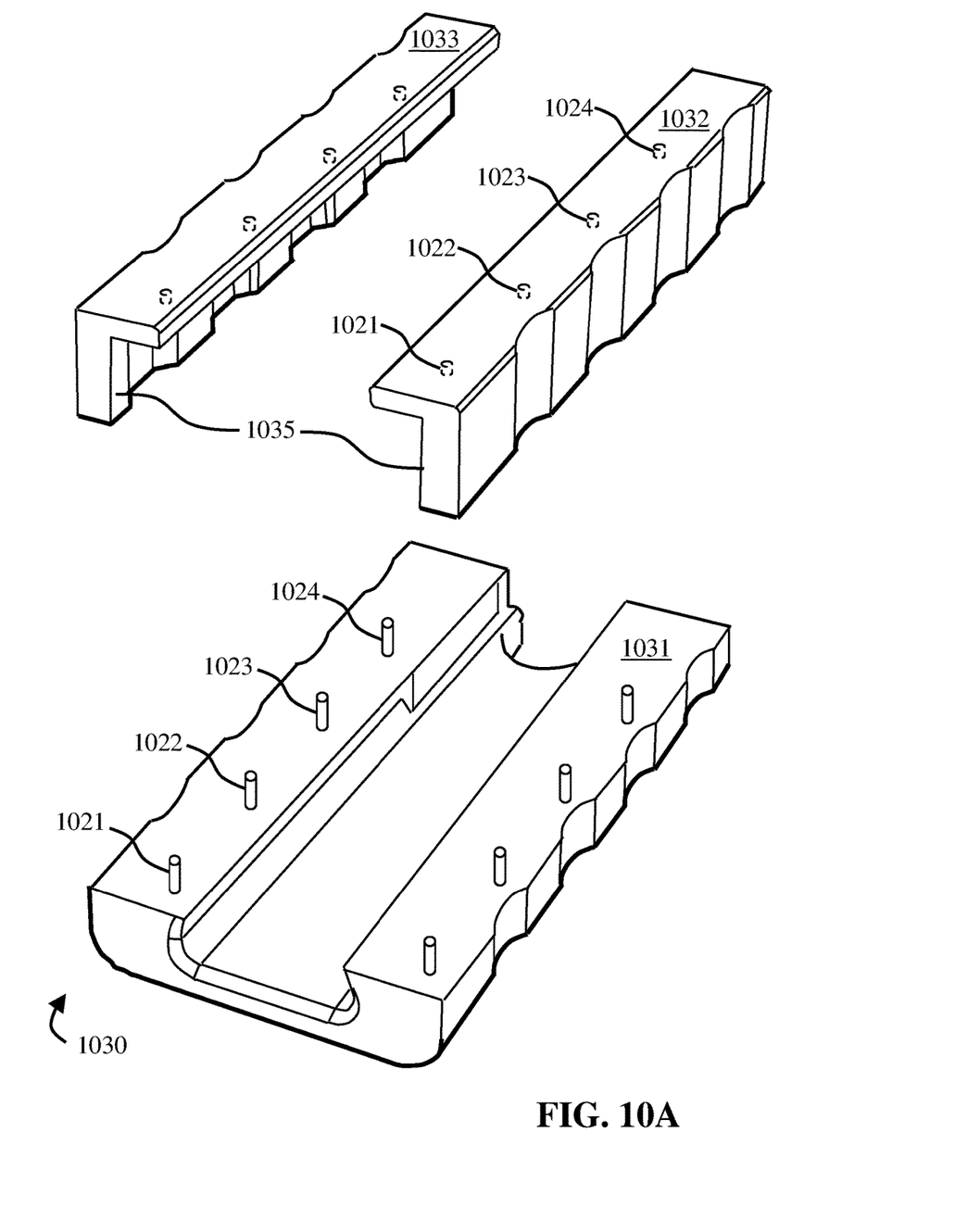
FIGS. 10A and 10B are approximate dimetric projection diagrams for unassembled components of alternative embodiments of a carrier assembly having an open channel to hold a plurality of paired gates.

FIG. 10A is an approximate dimetric projection diagram for unassembled components of one alternative embodiment of a carrier assembly 1030 having an open channel 1035 to hold a plurality of paired gates. Some embodiments of carrier assembly 1030, may include fasteners in open channel 1035 for functionally coupling carrier assembly portion 1031 with carrier assembly portions 1032 and 1033 to pivotally hold the plurality of paired gates at their respective positions, 1021, 1022, 1023 and 1024, along a channel corresponding to an elongate shaft of substantially zero curvature.

It will be appreciated that in some alternative embodiments of carrier assembly 1030, the fasteners in open channel 1035 for functionally coupling carrier assembly portion 1031 with carrier assembly portions 1032 and 1033 may be adapted to pivotally hold a plurality of paired gates, of various different heights, at their respective positions, 1021, 1022, 1023 and 1024, along a channel corresponding to an elongate shaft of a non-zero substantially constant curvature.

Figure 10B:
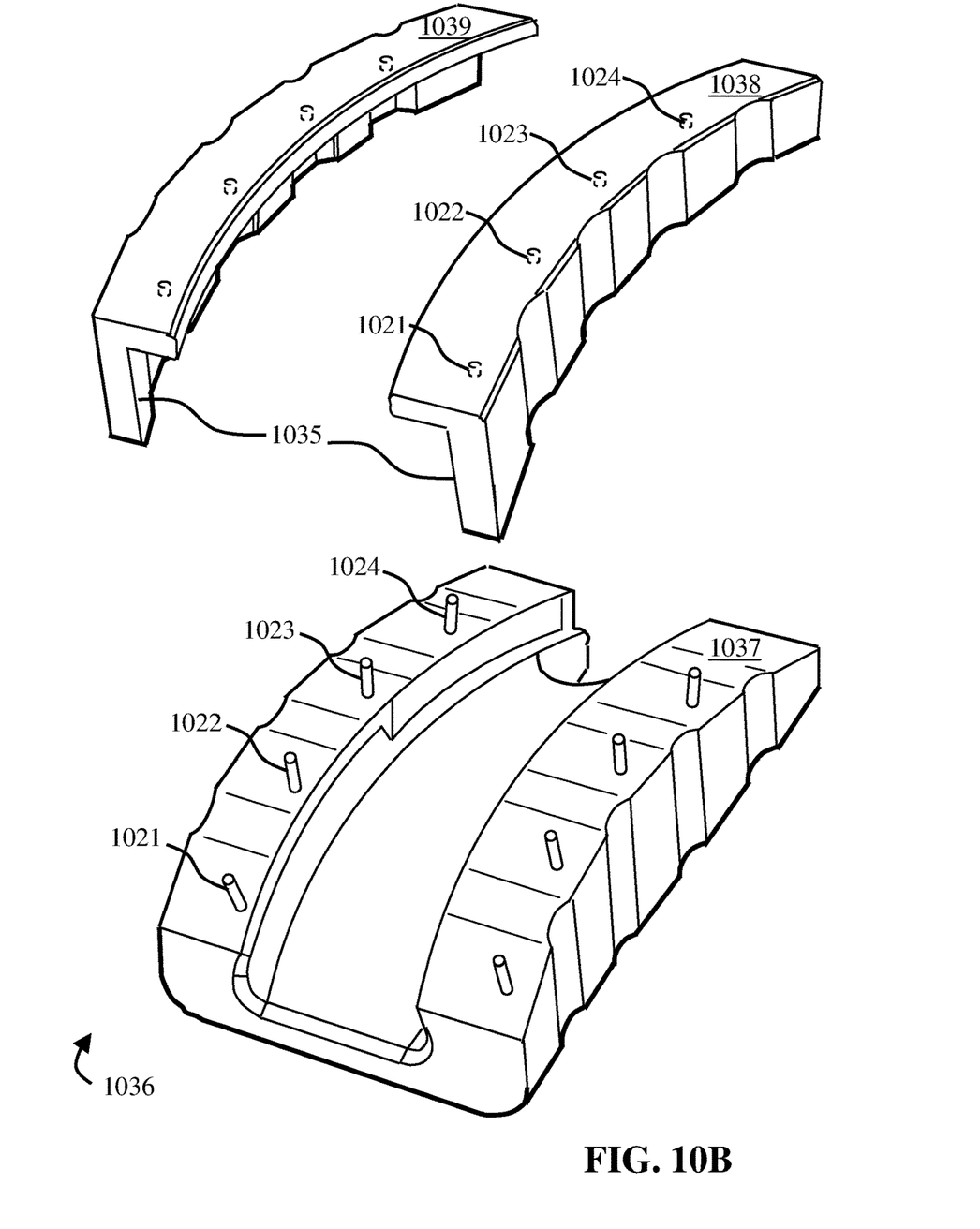

FIG. 10B is an approximate dimetric projection diagram for unassembled components of yet another alternative embodiment of a carrier assembly 1036 having an open channel 1035 to hold a plurality of paired gates. Some embodiments of carrier assembly 1036, may include fasteners in open channel 1035 for functionally coupling carrier assembly portion 1037 with carrier assembly portions 1038 and 1039 to pivotally hold the plurality of paired gates at their respective positions, 1021, 1022, 1023 and 1024, along a channel corresponding to an elongate shaft of a non-zero substantially constant curvature.

It will be appreciated that in some alternative embodiments of carrier assembly 1036, the fasteners in open channel 1035 for functionally coupling carrier assembly portion 1037 with carrier assembly portions 1038 and 1039 may be adapted to pivotally hold a plurality of paired gates, of various different heights, at their respective positions, 1021, 1022, 1023 and 1024, along a channel corresponding to an elongate shaft of substantially zero curvature. It will also be appreciated that in some alternative embodiments, carrier assembly 1030 or carrier assembly 1036 may include more or less fasteners in open channel 1035 for functionally coupling carrier assembly portions 1031 or 1037 with carrier assembly portions 1032 and 1033, or 1038 and 1039 respectively, to pivotally hold the plurality of paired gates at their respective positions.

Figure 11:
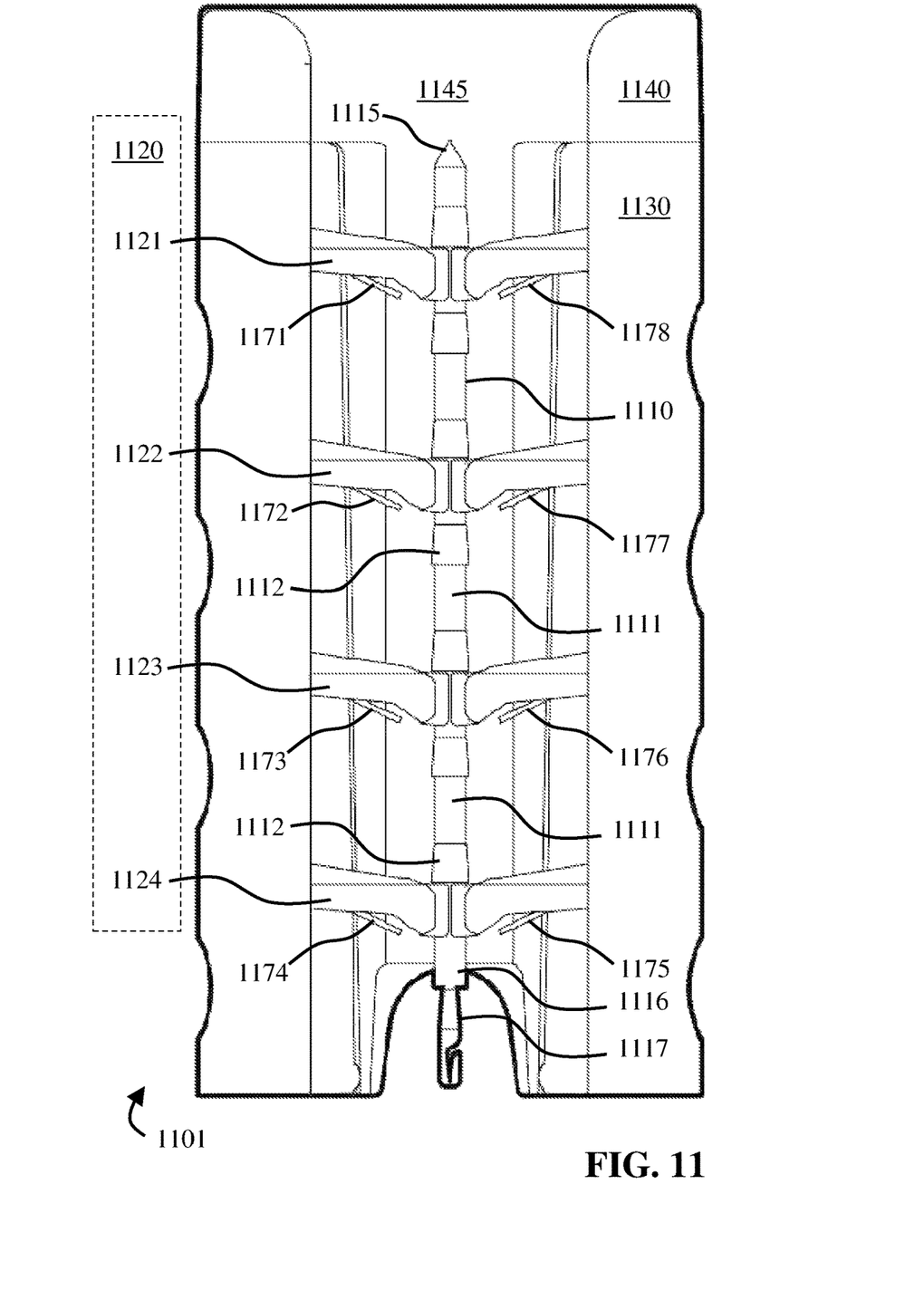
FIG. 11 is an approximate top view diagram for one embodiment of a mechanical system for threading fishing line through mounted guides or eyes of a fishing rod.

FIG. 11 is an approximate top view diagram for one embodiment of a mechanical system 1101 to thread fishing line through mounted guides or eyes of a fishing rod (not shown). Mechanical fishing line threading system 1101 comprises an elongate shaft 1110 to hold a fishing line, the elongate shaft having a front end 1115, and having a back end 1116 to detachably attach the fishing line proximate the back end 1116, e.g. via a hook 1117. The mechanical fishing line threading system 1101 also comprises a plurality of paired gates 1120 to fixedly retain the elongate shaft 1110 to thread a fishing rod with the fishing line. In some embodiments the elongate shaft 1110 may have a constant curvature, or zero curvature, to eliminate any complicated 'snaking' movements from the process of threading a plurality of mounted guides. In some embodiments the plurality of paired gates 1120 may include paired gates 1121, paired gates 1122, paired gates 1123 and paired gates 1124 to support the elongate shaft 1110 between the plurality of paired gates 1120.

The mechanical fishing line threading system 1101 also comprises a carrier assembly 1130 to hold the plurality of paired gates 1120 to permit a plurality mounted guides on the fishing rod (not shown) to pass between paired gates of the plurality of paired gates 1120 while being threaded with the fishing line by said elongate shaft 1110. In some embodiments the carrier assembly 1130 may have an open channel, e.g. wherein said carrier assembly 1130 may be configured to hold the plurality of paired gates 1120. In some embodiments of the mechanical fishing line threading system 1101, an end cap module 1140 may be detachably attached to said third means 1130 proximate a front end 1115 of the elongate shaft 1110 to direct each of the plurality of mounted guides, e.g. using a funneling channel 1145, toward the front end 1115 of the elongate shaft 1110, and to encircle the front end 1115 of elongate shaft 1110, so as to be threaded with the fishing line by said elongate shaft 1110.

It will be appreciated that the funneling channel 1145 of end cap module 1140 may provide additional assistance with threading guides or eyes that have relatively small diameters of, for example 4 to 5 millimeters or less, and/or in circumstances of poor lighting. It will be further appreciated that due to said first means 1110 being of a constant curvature or of zero curvature, improvement in the guide-threading process is provided, making guide-threading less complicated than prior art processes and reducing potential points of failure. It will also be appreciated that in some embodiments, having the elongate shaft 1110 of a constant curvature, or of zero curvature, may have an unexpected beneficial result, i.e. the facilitation of greater miniaturization in order to provide additional assistance with threading micro guides or eyes that have very small diameters of, for example 1 to 2 millimeters or less.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

Thus, techniques for using a mechanical system or device for threading fishing line through mounted guides or eyes of a fishing rod according to at least one embodiment are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be combined and/or may be readily modifiable in arrangement and detail as facilitated by enabling technological advancements without departing from the principles of the present disclosure or the scope of the accompanying claims.

What is claimed is:

1. A threading apparatus comprising:
a plurality of paired gates;
an elongate shaft having a front end and a back end, said elongate shaft to be supported between the plurality of paired gates and to detachably attach to a line proximate the back end;
a carrier assembly having an open channel, said carrier assembly being configured:
to hold said plurality of paired gates, and
to permit each of a plurality of mounted guides to pass between one or more open paired gates of the plurality of paired gates while being threaded with the line by said elongate shaft, wherein the elongate shaft is fixedly retained between another one or more paired gates while a mounted guide of the plurality of mounted guides passes between said one or more open paired gates.

2. The threading apparatus of claim 1, comprising:
an end cap module detachably attached to the carrier assembly proximate the front end of said elongate shaft to direct each of said plurality of mounted guides toward the front end of said elongate shaft, so as to be threaded with the line by said elongate shaft.

3. The threading apparatus of claim 2, wherein the end cap module has a funneling channel corresponding to the open channel of said carrier assembly to funnel each of said plurality of mounted guides to encircle the front end of said elongate shaft.

4. The threading apparatus of claim 2, wherein the end cap module has a funneling channel, corresponding to the open channel of said carrier assembly, that is sized to accommodate said plurality of mounted guides to funnel each of said plurality of mounted guides toward the front end of said elongate shaft.

5. The threading apparatus of claim 4, wherein the end cap module has a funneling channel and the smallest diameter of the plurality of mounted guides that said funneling channel is sized to accommodate is 6 to 10 millimeters.

6. The threading apparatus of claim 4, wherein the end cap module has a funneling channel and the largest diameter of the plurality of mounted guides that said funneling channel is sized to accommodate is 12 to 24 millimeters.

7. The threading apparatus of claim 6, wherein the smallest diameter of the plurality of mounted guides that said funneling channel is sized to accommodate is 3 to 5 millimeters.

8. The threading apparatus of claim 6, wherein the smallest diameter of the plurality of mounted guides that said funneling channel is sized to accommodate is less than 2 millimeters.

9. The threading apparatus of claim 1, wherein the back end of said elongate shaft comprises a miniaturized means for attaching a single-diameter width of said line proximate said back end.

10. A mechanically implemented method comprising:
supporting an elongate shaft between a plurality of paired gates, said elongate shaft having a front end and a back end to detachably attach to a line proximate the back end;
passing a carrier assembly having an open channel over a plurality of mounted guides, said carrier assembly being configured:
to hold said plurality of paired gates, and
to permit each of a plurality of mounted guides to pass between one or more open paired gates of the plurality of paired gates while being threaded with the line by said elongate shaft, wherein the elongate shaft is fixedly retained between another one or more paired gates while a mounted guide of the plurality of mounted guides passes between said one or more open paired gates; and
using a funneling channel of an end cap module detachably attached to the carrier assembly proximate the front end of said elongate shaft, while passing said carrier assembly over each of said plurality of mounted guides, to funnel each of said plurality of mounted guides to encircle the front end of said elongate shaft.

11. The mechanically implemented method of claim 10, wherein said funneling channel is sized to accommodate said plurality of mounted guides to funnel each of said plurality of mounted guides to encircle the front end of said elongate shaft, and the smallest diameter of the plurality of mounted guides that said funneling channel is sized to accommodate is 6 to 10 millimeters.

12. The mechanically implemented method of claim 10, wherein said funneling channel is sized to accommodate said plurality of mounted guides to funnel each of said plurality of mounted guides to encircle the front end of said elongate shaft, and the smallest diameter of the plurality of mounted guides that said funneling channel is sized to accommodate is 3 to 5 millimeters.

13. The mechanically implemented method of claim 12, wherein the largest diameter of the plurality of mounted guides that said funneling channel is sized to accommodate is 12 to 24 millimeters.

14. A fishing line threading system comprising:
a first means for holding a fishing line, said first means having a front end, and having a back end for detachably attaching to said fishing line proximate the back end;
a second means for fixedly retaining said first means to thread a fishing rod with the fishing line;
a third means for holding said second means while permitting a plurality mounted guides on the fishing rod to pass through said second means while being threaded with the fishing line by said first means; and
an end cap module detachably attached to said third means proximate a front end of said first means to direct each of said plurality of mounted guides toward the front end of said first means, so as to be threaded with the fishing line by said first means.

15. The fishing line threading system of claim 14, wherein said second means comprises a plurality of spring-loaded paired gates.

16. The fishing line threading system of claim 14, wherein said third means comprises a threading channel, said third means being configured:
to hold a portion of said second means comprising a plurality of paired gates, and
to permit each of the plurality of mounted guides to pass between one or more open paired gates of the plurality of paired gates while being threaded with the fishing line by said first means, wherein the first means is fixedly retained between another one or more paired gates of the plurality of paired gates while a mounted guide of the plurality of mounted guides passes between said one or more open paired gates of said second means.

17. The fishing line threading system of claim 14, wherein the back end of said first means comprises a miniaturized means for attaching a single-diameter width of said line proximate said back end.

18. The fishing line threading system of claim 14, wherein the end cap module has a funneling channel that is sized to accommodate said plurality of mounted guides and to funnel each of said plurality of mounted guides to encircle the front end of said first means.

19. The fishing line threading system of claim 18, wherein the smallest diameter of the plurality of mounted guides that said funneling channel is sized to accommodate is 3 to 6 millimeters.

20. The fishing line threading system of claim 19, wherein the largest diameter of the plurality of mounted guides that said funneling channel is sized to accommodate is 15 to 30 millimeters.

21. The fishing line threading system of claim 18, wherein the smallest diameter of the plurality of mounted guides that said funneling channel is sized to accommodate is less than 2 millimeters.

22. The fishing line threading system of claim 14, wherein said first means comprises an elongate shaft having a substantially constant, zero curvature.

23. The fishing line threading system of claim 14, wherein said second means comprises a plurality of paired gates operatively coupled with a gate locking mechanism.

24. The fishing line threading system of claim 14, wherein said first means comprises an elongate shaft having a substantially constant, non-zero curvature.

* * * * *